United States Patent [19]
Brockhoff et al.

[11] Patent Number: 6,077,328
[45] Date of Patent: Jun. 20, 2000

[54] PROCESS FOR REDUCING THE DIOXIN AND FURAN CONTENT IN WASTE GASES FROM FURNACES, AND USE OF THE FILTER DUSTS PRODUCED THEREBY

[75] Inventors: Reiner Brockhoff, Muelheim a.d. Ruhr; Klaus Hartmann, Neuss; Jens Hoeltje, Krefeld; Hans-Juegen Korte, Duesseldorf, all of Germany

[73] Assignee: Solvay Alkali GmbH, Hannover, Germany

[21] Appl. No.: 09/011,534

[22] PCT Filed: Aug. 2, 1996

[86] PCT No.: PCT/EP96/03407

§ 371 Date: Feb. 2, 1998

§ 102(e) Date: Feb. 2, 1998

[87] PCT Pub. No.: WO97/06876

PCT Pub. Date: Feb. 27, 1997

[30] Foreign Application Priority Data

Aug. 11, 1995 [DE] Germany ............ 195 29 649
May 29, 1996 [DE] Germany ............ 196 21 492

[51] Int. Cl.[7] ............... C22B 9/16; C22B 21/00
[52] U.S. Cl. ............... 75/414; 75/403; 75/687; 75/961
[58] Field of Search ............... 75/403, 414, 687, 75/961

[56] References Cited

U.S. PATENT DOCUMENTS

| | | |
|---|---|---|
| 3,907,971 | 9/1975 | Boehm et al. . |
| 4,065,271 | 12/1977 | Weckesser et al. . |
| 4,368,070 | 1/1983 | Fracchia . |
| 5,364,443 | 11/1994 | Tremblay et al. ............ 75/687 |

FOREIGN PATENT DOCUMENTS

| | | |
|---|---|---|
| 2114417 | 6/1972 | France . |
| 294187 | 9/1991 | Germany . |
| 4109991 | 6/1992 | Germany . |
| 899 101 | 1/1982 | U.S.S.R. . |

*Primary Examiner*—Melvyn Andrews
*Attorney, Agent, or Firm*—Evenson, McKeown, Edwards & Lenahan, P.L.L.C.

[57] ABSTRACT

A process for purifying waste gases from smelting, resmelting or combustion plant furnaces and the use of the filter dusts produced. The invention is used in particular in the production or preparation of nonferrous metals. According to the invention, at least one alkali compound, in particular $NaHCO_3$, is injected dry, optionally in the presence of activated carbon and/or open hearth coke, into the waste gas leaving the production process. The separated filter dust is fed back to the smelting or combustion process. It has unexpectedly been found that the returned filter dust can lower the dioxin and furan contents of the crude gas. Owing to the composition of the filter dust, it can also be used as protective salt in secondary aluminum production.

7 Claims, No Drawings

PROCESS FOR REDUCING THE DIOXIN AND FURAN CONTENT IN WASTE GASES FROM FURNACES, AND USE OF THE FILTER DUSTS PRODUCED THEREBY

BACKGROUND OF THE INVENTION

The invention relates to a process for purifying waste furnace gases from melting, remelting and incinerating plants, as well as to the utilization of the filter dusts produced thereby.

The invention finds application particularly for the production or refining of nonferrous metals, the filter dusts produced being returned to the melting process.

It is well known that harmful substances, contained in the crude gas, can be removed from the waste gases by adsorption on additives or by chemical reaction with the additives. In this way, the waste gases are freed from materials including dusts, sulfur dioxide, HCl and/or HF.

For example, wet, semi-dry and dry processes are known, for which, for example, burnt lime, calcium hydroxide or alkali compounds are used as additives.

It is a disadvantage of the known methods that the elimination rate of the dioxins and furans frequently does not satisfy requirements.

The resulting filter dusts are usually dumped as garbage.

For metal refining processes, metal or metal scrap, melting aids, such as blanketing salts, and energy are supplied. Metal, slags, such as salt slags, and waste gases containing harmful substances and dust leave the production process.

The resulting slags either are refined to recover valuable materials or dumped as garbage. The waste gases are freed from dusts, sulfur dioxide, HCl and HF. Usually, methods are used for this purpose for which such materials as burnt lime or calcium hydroxide are used as adsorbents. The resulting filter dusts are dumped as garbage.

Different types of furnaces, which are heated electrically or with gas or oil, are used to produce cast aluminum alloys. The rotating drum furnace is widespread. It is suitable particularly for melting contaminated aluminum waste, shavings and other materials in small pieces, particularly however charge materials with a low yield.

Melting aluminum-containing scrap (aluminum waste, shavings, waste metal, etc.) in the rotating drum furnace usually takes place under a closed salt blanket. The task of the salt is to prevent oxidation of the aluminum, to bind the nonmetallic impurities of the metal-containing charge and to facilitate the detachment of oxide layers from the base metal. The salt, from which the salt blanket is formed, consists of about 70% NaCl, about 30% KCl and approximately 5% flux. The process temperatures are between 600° C. and 900° C., depending on the alloy. Fossil fuels are used as energy carrier.

Aside from NaCl and KCl, aluminum, in the form of $AlCl_3$ and $AlF_3$, also evaporates at the temperatures existing during the melting process, the latter being decomposed in the waste gas stream to HCl and HF. Aside from these acidic components, the waste gas stream also contains $SO_2$, it being possible for the composition of the components of the waste gas to fluctuate depending on the materials that are to be melted and on the heating medium. Furthermore, sublimed alkali chlorides and fluorides, aluminum oxide and small amounts of heavy metals, aluminum in metallic form and free and organically bound carbon in the form of, for instance, dibenzodioxins and dibenzofurans (PCDDD/F) are contained in the waste gas. The waste gas, as well as the resulting salt slags must be freed from the harmful substances.

Technological solutions for the purification of the salt slag are known. For example, the salt slag can be purified by the dissolving method in such a manner, that the purified mixed salt can be used once again as a blanketing salt in the rotating drum furnace. The insoluble sediments (alumina residues), remaining after the dissolving process, are processed further.

The waste gases, which contain components that contaminate the environment, are presently freed from undesirable components in waste gas purification systems.

Usually the waste gases are reacted in a dry process at about 100 to 350° C. with $Ca(OH)_2$ as absorbent, free chlorine, HCl, HF and $SO_2$ being reacted to form $CaCl_2$, $CaF_2$ and $CaSO_4$. The dioxins and furans are bonded adsorptively.

After the gas-dust mixture has been cooled to about 90 to 200° C., the dust is deposited in fabric filters. It has been customary up to now to dump the dusts as garbage. From economic and ecological points of view, efforts must be made to work up these filter dusts, which are obtained in an amount of approximately 20 to 70 kg/t of secondary aluminum. The object of the invention is to provide a process for decreasing the dioxin and furan content in flue gas, especially in the crude gas produced during processing of non-ferrous metals, with simultaneous optimal purification of the waste gases.

SUMMARY OF THE INVENTION

Pursuant to the invention, this objective is accomplished owing to the fact that at least one alkali compound, optionally in the presence of activated charcoal and/or open hearth coke, is brought into the waste gas and the resulting filter dust is returned to a melting or incinerating process. As alkali compound, sodium carbonate, sodium hydrogen carbonate, sodium hydroxide, potassium carbonate, potassium hydroxide and/or potassium hydrogen carbonate is/are used alone or in admixture. When industrial-grade mixtures are used, impurities, such as alkaline earth compounds, can be accepted in amounts ranging up to 5% without affecting the essence of the invention. The activated charcoal and/or the open hearth coke can be brought into the waste gas stream separately or in admixture with the alkali compound.

DETAILED DESCRIPTION OF PREFERRED EMBODIMENTS

It is also possible to remove the dust from the waste gas, before the latter is treated with the alkali compound.

In a preferred variation, sodium hydrogen carbonate, which has an average particle size of 1 to 100 $\mu$m, particularly of 5 to 40 $\mu$m and especially of 10 to 35 $\mu$m, is sprayed dry into a reactor or into the flue gas duct, preferably counter to the direction of flow, and mixed with the flue gases. The residence time in the flue gas (without the residence time in the filter) is at least 0.5 seconds and preferably more than 2 seconds. During this time, the harmful substances are reacted, for example, to NaCl and $Na_2SO_4$.

In one embodiment, industrial grade sodium hydrogen carbonate having the following composition was used:

content >99.0%
chloride 0.01%
calcium <0.02%
loss on drying <0.1%

The effect of the alkali compound can be improved by the addition of activated charcoal and/or open hearth coke. In particular, the dioxins and furans are adsorbed.

It may be assumed that the dioxins and furans are formed during the production of secondary aluminum because of the temperature existing in the rotary furnace. The bulk by far is contained in the crude gas, passes through the flue gas purification system and reaches the filter dusts. An amount of 5 ng/kg, for example, was determined to be present in the salt slag and, on the other hand, an amount of 8 ng/kg in the filter dust. In comparison to the crude gas, the pure gas, leaving the smokestack, contains extremely small amounts of dioxins and furans. It might be assumed that, by recycling the dioxin-containing and furan-containing filter dusts, the content of dioxin and furan in the crude gas or in the salt slag would remain the same or be increased, but would not be decreased. Surprisingly, it was found on the contrary that, by recycling the filter residues in the rotary furnaces, the formation of dioxins and furans in the rotary furnace is decreased. A decrease in the content of dioxins and furans by about half the original value is found in the filter residue, which is now obtained after the crude gas is purified with the alkali compound.

In a preferred embodiment of the method, a mixture of alkali compound and 1 to 6% by weight (based on the total amount used) and preferably 4% by weight of activated charcoal and/or open hearth coke is used for purifying the flue gas.

The concentration of HCl in the pure gas is usually selected as the guiding quantity for the amount of additive to be added. HCl is the main harmful substance, which is eliminated with sodium hydrogen carbonate. The amount of additive required cannot be fixed clearly because of the fluctuations in the crude gas values arising in the plant.

The amount of additive actually used thus depends on the amount of harmful substance, which is actually to be removed. For example, about 8 to 12 kg of additive are used per ton of aluminum.

An optimized amount of additive is important particularly with respect to the recycling of the filter dust into the aluminum melt. Sodium hydrogen carbonate, which has not reacted with harmful substances, is decomposed into sodium carbonate. An excessively high proportion of sodium carbonate in the blanketing salt can lead to aluminum losses in the melting process. For economic reasons, however, aluminum losses are to be kept at a minimum.

The minimum reaction temperature for purifying flue gas is between about 70 and about 500° C. and preferably between 90 and 280° C.

The gas stream, which contains the reaction products, such as sodium chloride, sodium sulfate and sodium carbonate, passes, for example through a fabric filter, in which the solids are deposited. The filter dust, removed by the purification of the flue gas, contains largely NaCl as well as small amounts of, for example, sodium sulfate, sodium fluoride and additive components, which have not reacted with the harmful substances.

Because of their composition, the solids are mixed with the blanketing salt in the ratio of about 1 to 5 up to 1 to 15and returned to the rotating drum furnace. Due to this possibility of utilizing the filter dusts as blanketing salt, the amount of fresh salt charged can be reduced and the amount of dioxins and furans in the crude gas can be lowered and the dumping of residues as garbage can be omitted.

Because of the values found, it may be assumed that, by conducting the reaction in the melting furnace, on the one 1hand, the dioxins and furans, which are contained in the residues of the flue gas purification process, are decomposed. Furthermore, the recycled filter dust brings about a suppression of the formation and/or a decomposition of the dioxins and furans that have already been formed.

It is thus possible to lower the dioxin and furan content in the crude gas of melting and incinerating plants by recycling the filter dusts into the furnace.

It is a further positive aspect that, in comparison with calcium hydroxide as additive for flue gas purification, the required amount of additive can be reduced. Accordingly, only 30% to 60% by weight of the previously customary amounts of additive are required.

A further advantage of the inventive method is the possibility of using the alkali compounds formed in further processes, such as the use of sodium compounds as sodium carriers or as additives for different processes.

It is also within the scope of the invention to purify waste gases from other production processes, such as incinerators, in a manner similar to that described above by spraying in, for example, dry sodium hydrogen carbonate, optionally in the presence of activated charcoal and/or open hearth coke and to use the solid sodium compounds formed as blanketing salt for refining nonferrous metals, such as aluminum scrap.

The following example is intended to explain the invention without limiting it.

EXAMPLE 1

In a batch process in different rotary furnaces, 100 tons of secondary aluminum are melted per day. The melting process takes place under a blanket of salt, which consists of approximately 70% by weight of sodium chloride (NaCl), approximately 30% by weight of potassium chloride (KCl) and approximately 5% of flux. This salt mixture is used at the rate of about 80 tons per day.

During the melting process, approximately 70,000 $Nm^3$/hour of waste gas are formed and contains the following amounts of harmful substances:

approx. 3 $g/Nm^3$ of dust, approx. 150 $mg/Nm^3$ of HCl, approx. 50 $mg/Nm^3$ of $SO_2$, approx. 20 $mg/Nm^3$ of HF and approx. 15 ng of "TE"/$Nm^3$ of dioxins and furans The temperature of the waste gas as it enters the flue gas purification system is about 230° C.

With the help of conveying air, about 45 kg/hour of sodium bicarbonate with an average particle diameter of 25 $\mu$m and about 2 kg/hour of open hearth coke are sprayed into the flue gas. The flue gas subsequently flows through a contact reactor with a residence time of about 0.5 seconds. After that, the flue gas is cooled in a cooler to about 100° C., before the solid particles are removed in a fabric filter. The flue gas, leaving the fabric filter, has the following concentrations of harmful substances.

approx. 5 $mg/Nm^3$ of dust, approx. 25 $mg/Nm^3$ of HCl, approx. 10 $mg/Nm^3$ of $SO_2$, approx. 1 $mg/Nm^3$ of HF and approx. 0.1 ng of "TE"/$Nm^3$ of dioxins and furans From the fabric filter, about 185 kg/hour are removed from the melting process and about 32 kg/hour of products are removed from the flue gas purification system. The composition of the products from the flue gas purification is as follows:

approx. 45% by weight of NaCl, approx. 19% by weight of $Na_2SO_4$ approx. 8% by weight of NaF, approx. 22% by weight of $Na_2CO_3$ and approx. 6% by weight of open hearth coke.

These solids from the fabric filter are mixed with the salt for the salt blanket and returned to the individual melting furnaces. Because the solids are returned from the fabric filter to the melting process, there is no increase in the concentration of harmful substances in the crude gas; instead, there is a decrease in the dioxin content and the furan content. Since the largest portion, by far, of the dioxins and furans is eliminated in the flue gas purification system, the filter dusts obtained were investigated with respect to the concentration of the dioxins and furans. For comparison, values are given, which result from the procedures with calcium hydroxide as well as without recycling of filter dust.

TABLE

| Additive | Dioxins and Furans in the Filter Dust g/Day | Total Amount of Filter Dust kg/Day |
|---|---|---|
| Calcium hydroxide + 3% activated charcoal | 0.051 | 6200 |
| Sodium hydrogen carbonate + 4% open hearth coke (without recycling filter dust) | 0.052 | 4700 |
| Sodium hydrogen carbonate + 4% open hearth coke (with recycling filter dust) | 0.025 | 4700 |

The values given clearly show the advantages over the conventional method of flue gas purification with potassium hydroxide. On the one hand, because of the recycling, less dioxins and furans are contained in the resulting filter dust; on the other, the resulting amount of filter dust is decreased by the use of sodium hydrogen carbonate as additive.

What is claimed is:

1. A method of decreasing the dioxin and furan contents in a flue gas leaving a melting or incinerating furnace, said method comprising the steps of:
  a) spraying at least one alkali metal compound selected from the group consisting of sodium carbonate, sodium bicarbonate, sodium hydroxide, potassium carbonate, potassium bicarbonate and potassium hydroxide into the flue gas;
  b) separating resulting filter dusts, and
  c) recycling separated filter dusts into a melting process.

2. A method according to claim 1, wherein the sprayed alkali metal compound has an average particle size of 1 to 100 $\mu$m.

3. A method according to claim 2, wherein the sprayed alkali metal compound has an average particle size of 5 to 40 $\mu$m.

4. A method according to claim 1, wherein at least one carbonaceous material selected from the group consisting of activated charcoal and open hearth coke is sprayed in in addition to the alkali metal compound, the proportion of said carbonaceous material being 1 to 6% by weight, based on the total amount of sprayed material.

5. A method according to claim 4, wherein the carbonaceous material is sprayed in separately from the alkali metal compound.

6. A method according to claim 4, wherein the carbonaceous material is sprayed in in admixture with the alkali metal compound.

7. A method according to claim 1, wherein the separated filter dusts are recycled into an aluminum scrap melting furnace.

* * * * *